Figure 1:
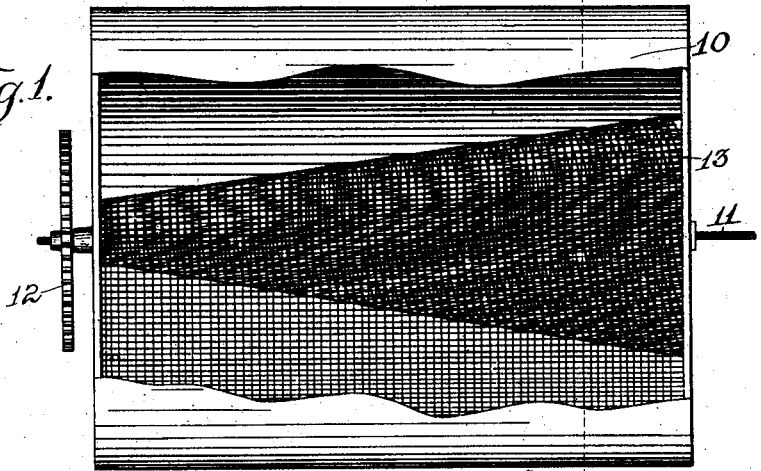

No. 760,604. PATENTED MAY 24, 1904.
J. B. BARTHOLOMEW.
APPARATUS FOR POPPING CORN.
APPLICATION FILED DEC. 8, 1891.
NO MODEL. 2 SHEETS—SHEET 1.

Witnesses
F. C. Tate.
D. R. Green.

Inventor
John B. Bartholomew,
by Bulkley & Sweet,
his Atty's

No. 760,604. PATENTED MAY 24, 1904.
J. B. BARTHOLOMEW.
APPARATUS FOR POPPING CORN.
APPLICATION FILED DEC. 8, 1891.

NO MODEL. 2 SHEETS—SHEET 2.

Witnesses
Wm H. Edwards
Arthur L. Bryant

Inventor
J. B. Bartholomew
by
A. H. Bliss
associate atty.

No. 760,604.

Patented May 24, 1904.

UNITED STATES PATENT OFFICE.

JOHN B. BARTHOLOMEW, OF DES MOINES, IOWA.

APPARATUS FOR POPPING CORN.

SPECIFICATION forming part of Letters Patent No. 760,604, dated May 24, 1904.

Application filed December 8, 1891. Serial No. 414,399. (No model.)

*To all whom it may concern:*

Be it known that I, JOHN B. BARTHOLOMEW, a citizen of the United States, and a resident of Des Moines, in the county of Polk and State of Iowa, have invented a new and useful Apparatus for Popping Corn, of which the following is a specification.

My invention relates to that class of mechanism employed to pop corn, and has for its object the provision of means simple, compact, and cheap in construction by which the kernels of corn to be popped are retained during the operation of popping within a revoluble containing-receptacle and subjected to the influence of heat, said kernels being constantly in motion until discharged, this latter result being accomplished after the kernels of corn have been completely popped.

A further object of my invention resides in the provision of means by which, in a revoluble containing-receptacle within which the corn is treated for the purpose of popping, the popped kernels are separated out from the unpopped kernels and normally caused to travel from all parts of the interior of the containing-receptacle as soon as popped toward and out of the discharge-opening, the unpopped kernels being at times fed toward the central portion of the said receptacle to insure its complete separation from the popped kernels, by this means, in addition to other advantages, permitting the use of a containing-receptacle of increased horizontal dimension.

Another object of the invention is to provide devices which shall support the unpopped corn upon a highly-heated surface which shall retain the heat and which shall prevent flame or products of combustion either from coming in direct contact with the unpopped corn or impinging upon the corn after it has been popped to char or otherwise impair it. To carry out this part of the invention, I employ an exterior imperforate sheet-metal drum, shell, or casing and an interior shifting device, the imperforate casing receiving and supporting the unpopped corn, and because of its being imperforate it can have the flame or the heated currents of products of combustion impinge directly upon its exterior surface and be thereby highly heated, and the continuity of the metal thereof retains the heat for a long period, so that the unpopped corn is more quickly and continuously affected by the heat, and, again, by being imperforate the flame or combustion products are entirely excluded from the interior. This is in contradistinction to the corn-poppers heretofore used having foraminous or reticulated casings, which by reason of their being thus foraminous or perforated quickly disseminate and loose the heat from the metal as soon as it leaves the immediate area of the flame and also allow the flame, smoke, and other products of combustion to pass through the apertures and come in contact with the corn while popping, thus not only interfering with the proper action, but imparting disagreeable tastes and odors, and also to play upon the lifted popped corn and discolor and deteriorate it. Upon a continuous sheet metal the corn can be quickly very highly heated, and then before burning takes place the interior shifting device immediately picks it up and carries it away from the highly-heated surface into a region where there is less heat than there is in the constructions that permit flame and hot gases to pass up through the body of the receptacle.

Figure 2:
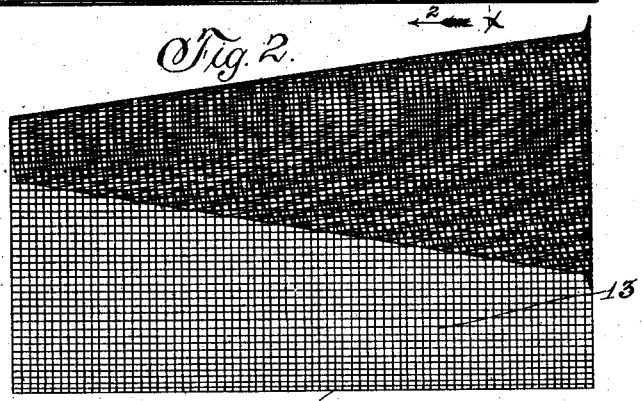
Figure 3:
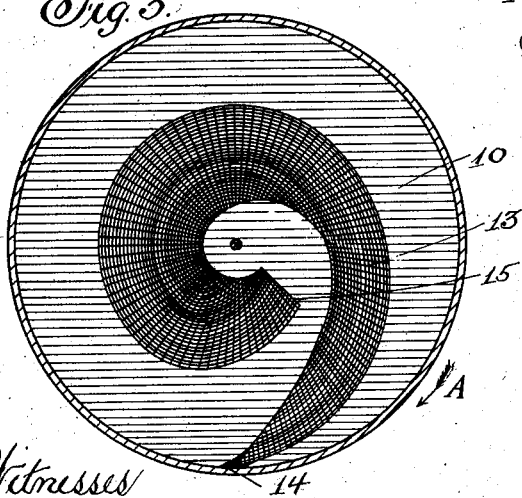
Figure 4:
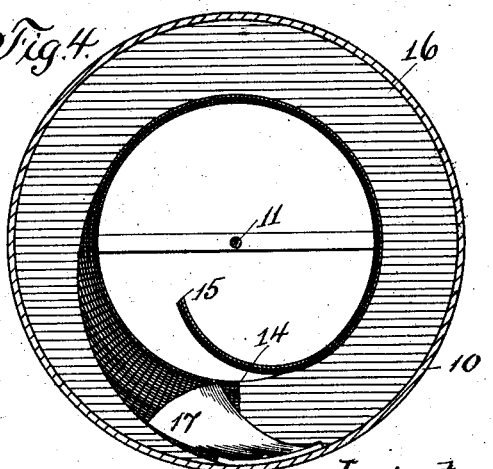
Figure 5:
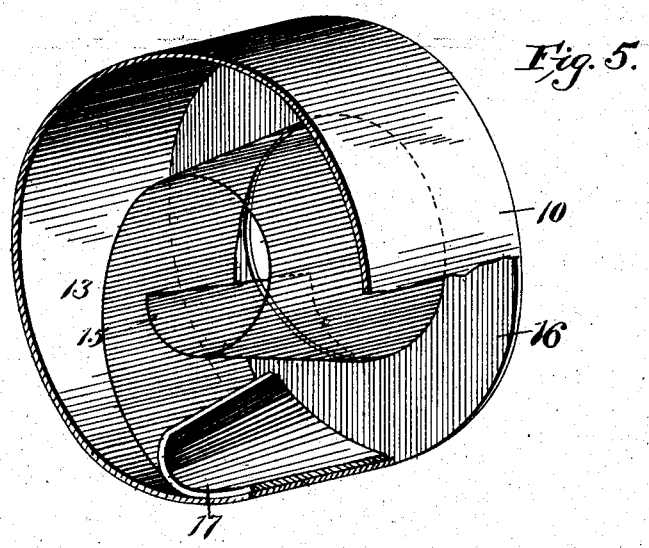
Figure 6:
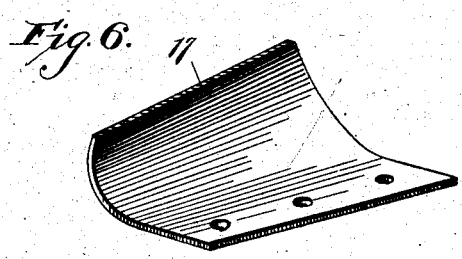

Figure 1 represents a side elevation of my improved corn-popper, a portion of the containing-receptacle being broken away. Fig. 2 is a side elevation of the screen, shown detached. Fig. 3 is a transverse sectional view on the line X X, Fig. 1, looking toward the closed end of the cylinder. Fig. 4 is a like view looking toward the discharge end of the cylinder. Fig. 5 is a detail perspective view of a portion of the apparatus. Fig. 6 is a detail view of the deflector-plate.

The numeral 10 designates an imperforate cylindrical containing-receptacle within which the kernels of corn to be popped are deposited, said receptacle being rotatively mounted upon suitable journals by means of the shaft 11, power being applied to said shaft by any suitable prime mover by means of the gear-wheel 12 or any other desired transmitting mechanism. One of the ends of the cylindrical containing-receptacle 10 is closed, while the opposite end is open and is provided with a suitable opening or door through which corn can be introduced into the interior of the cylinder. Located and disposed within the said receptacle 10 is a screen 13, the mesh of which is of such dimension as readily to permit the passage therethrough of the unpopped kernels of corn, but which obstructs and prevents the passage therethrough of the popped kernels. The screen 13 is formed into a single convolution and also so further formed as to provide a substantially cone-shaped inner face. This cone-shaped convoluted screen 13 is disposed horizontally within the containing-receptacle 10 in such a manner as that what may be termed the "apex" of the cone is adjacent to the closed end of the receptacle and its base approximately coincident with the open end of said receptacle. The outer margin 14 of the screen 13 is fastened to the cylindrical side of the receptacle 10, and a space is provided between said outer margin 14 and the inner margin 15 of the convolution of the screen 13.

Secured to the open end of the receptacle 10 is a rim 16, which partially closes said open end, the base of the cone-shaped screen being disposed eccentrically relatively to the aperture so formed.

Secured to the cylindrical sides of the receptacle 10, within the interior thereof at a point adjacent to the inner margin 15 of the screen 13 and the apertured end of the said receptacle, is a deflecting-plate 17.

The operation of my improved corn-popper is as follows: The desired quantities of unpopped corn are deposited by any suitable means of feeding within the interior of the containing-receptacle 10 through the apertured end of said receptacle, the aperture in said end also constituting the discharge-opening for the popped kernels of corn, the unpopped kernels of corn when so fed finding their way to and resting and moving upon the imperforate sides of the receptacle 10 by virtue of the size of the mesh of the screen 13. The cylindrical containing-receptacle 10 being rotated and heat applied by any suitable means to the exterior surface of the sides of said receptacle, it will be found that the unpopped kernels of corn are massed together at points adjacent to and along the outer margin 14 of the screen 13, a constant movement being imparted to the kernels of corn in the rotation of the receptacle, the normal tendency of movement of said kernels, both popped and unpopped, being toward the screen 13, since said movement of rotation of the receptacle is in the direction of the bent arrow A, Fig. 3, the unpopped kernels of corn passing through the mesh of the screen 13 and returned to the mass adjacent to the inner margin of the said screen 13, the popped kernels of corn, by virtue of their increased size and irregular shape, being held from passing through the screen upon the inner inclined face of the cone-shaped screen 13. By reason of the cone shape of the screen the immediate normal tendency of movement of the popped corn is toward and out of the discharge-opening along the plane which slopes at all points from the closed end of the cylinder to said discharge-opening. The deflecting-plate 17 insures the passage of each kernel of unpopped corn through the screen 13, since all of the said kernels are deflected toward the central portion of the receptacle at this point before passing to the screen 13, so that of necessity all of the kernels must fall through the mesh of the screen, rendering it impossible for those kernels of unpopped corn adjacent to the discharge-opening to fall out before popping.

By reason of the fact that the longitudinal dimension of the containing-receptacle is greater than the diametrical dimension thereof an increased radiating-surface is provided to be acted upon by the heat and the entire mass of corn is retained within the influence of the heat until finally discharged from the receptacle.

Owing to the formation of the screen convolute and approximately conical, the diametrical dimension of the receptacle may be materially lessened and the longitudinal dimension thereof proportionately increased, at the same time insuring the dividing out and discharging of all of the popped kernels of corn directly upon their becoming popped, thus avoiding the otherwise objectionable feature of the overflowing of the popped corn onto the mass of corn remaining unpopped.

The hereinbefore-mentioned lessening of the diametrical dimension of the receptacle brings the upper surface closer to the heat-supply, thus materially lessening the alternate heating and cooling of the receptacle and insuring a more uniform action of the heat upon the corn and lengthening the life of the receptacle.

I am aware that prior to my invention it has been proposed to construct a corn-popper consisting of an external shell and an interior convolute to separate the popped from the unpopped corn, and therefore make no claim herein to such a construction, broadly considered; but in all of the earlier proposed constructions with which I am familiar the popped corn had to be removed from the convolute by the attendant or was only delivered at intervals therefrom. By my construction, however, owing to the fact that the convolute is inclined throughout its entire length toward the discharge end the popped corn is continuously delivered from the apparatus at all times during the revolution of the convolute. Another objection to such earlier constructions has been that the external shell or casing has been composed of foraminous material, which allowed the products of combustion from the heating-flames to mingle with the corn in the popper. This objection I overcome by making the external cylinder of thin imperforate sheet metal. With such a construction a high degree of heat can be imparted to the interior of the popping-chamber; but it is impossible for the flames to contact with the corn therein or for the products of combustion to enter such chamber.

Having thus described my invention, what I claim as new therein, and desire to secure by Letters Patent of the United States, is—

1. In a corn-popper the combination of an external popping-cylinder formed of imperforate sheet metal for the purposes set forth, and an interior sieve-like foraminous convolute adapted to separate the popped from the unpopped corn, said convolute being arranged to automatically advance the popped corn longitudinally of the popping-cylinder to a discharge-opening in the end thereof, substantially as set forth.

2. An apparatus comprising a suitably-mounted revoluble containing-receptacle within which the unpopped kernels of corn are deposited and subjected to heat, a discharge-opening in one of the ends of said receptacle, a substantially cone-shaped convolute screen for separating out the popped from the unpopped kernels of corn, disposed horizontally within the containing-receptacle and providing an inclined plane from all parts of the interior of the cylinder whereby the kernels of corn upon becoming popped are immediately fed toward and out of the discharge-opening and a deflecting-plate secured within the interior of the containing-receptacle at a point adjacent to the discharge-opening for feeding the unpopped kernels toward the central portion of said receptacle to insure their passage through the screen.

3. In a corn-popper, the combination with a popping-cylinder, of means arranged within said cylinder for separating the popped corn from the unpopped corn, means for automatically discharging the popped corn from the cylinder, and means for deflecting the unpopped corn inward from the discharge-opening of the popping-cylinder, substantially as set forth.

4. In a corn-popper, the combination with a popping-cylinder with means arranged within the cylinder for separating the popped corn from the unpopped corn, means for automatically discharging the popped corn from the cylinder, and a deflector-plate secured to and extending transversely of the popping-cylinder for guiding the unpopped corn inward from the discharge-opening of the cylinder, substantially as set forth.

5. A corn-popper consisting of an external imperforate cylindrical shell open at one end, and a cone-shaped convolute screen secured to the inner face of the closed end of said cylindrical shell and extending in an inclined path to the open end of the external shell, substantially as and for the purpose set forth.

6. In a corn-popper adapted to automatically discharge popped corn while in operation, the combination of the exterior popping-cylinder, means for separating the popped from the unpopped corn and carrying the popped corn where it can be discharged, and means supplemental to the cylinder and said separating means for preventing the escape of the unpopped corn from the popping-cylinder, substantially as set forth.

7. A corn-popper having a rotary popping-cylinder with a discharge-opening at one end, means for separating the popped from the unpopped corn, and an inclined perforated support for the popped corn along which it travels after separation toward the discharge-opening, and means supplemental to the cylinder and said separating means for retaining the unpopped corn in the cylinder until popped and lifted by the screen-like means, substantially as set forth.

In testimony whereof I have hereunto affixed my signature in the presence of two witnesses.

JOHN B. BARTHOLOMEW.

Witnesses:
WM. M. WILCOXEN,
CHARLES C. BULKLEY.